US011835761B2

(12) United States Patent
Moriwaki et al.

(10) Patent No.: US 11,835,761 B2
(45) Date of Patent: Dec. 5, 2023

(54) PLANAR OPTICAL WAVEGUIDE CIRCUIT (71) Applicant: Nippon Telegraph and Telephone Corporation, Tokyo (JP)

(72) Inventors: Osamu Moriwaki, Musashino (JP); Kenya Suzuki, Musashino (JP); Takashi Go, Musashino (JP); Manabu Oguma, Musashino (JP); Yuichiro Ikuma, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 361 days.

(21) Appl. No.: 17/420,371

(22) PCT Filed: Jan. 8, 2020

(86) PCT No.: PCT/JP2020/000243
§ 371 (c)(1),
(2) Date: Jul. 1, 2021

(87) PCT Pub. No.: WO2020/145284
PCT Pub. Date: Jul. 16, 2020

(65) Prior Publication Data
US 2022/0091329 A1 Mar. 24, 2022

(30) Foreign Application Priority Data
Jan. 11, 2019 (JP) ................... 2019-003792

(51) Int. Cl.
*G02B 6/12* (2006.01)
*G02B 6/122* (2006.01)

(52) U.S. Cl.
CPC ......... *G02B 6/122* (2013.01); *G02B 6/12007* (2013.01); *G02B 2006/12104* (2013.01); *G02B 2006/12164* (2013.01)

(58) Field of Classification Search
CPC ............... G02B 6/12007; G02B 2006/12164
See application file for complete search history.

(56) References Cited

U.S. PATENT DOCUMENTS

2003/0174962 A1* 9/2003 Poole .................. G02B 6/2852
385/48
2003/0185534 A1 10/2003 Kaneko et al.
(Continued)

FOREIGN PATENT DOCUMENTS

JP H11-352344 A 12/1999
JP 2003-287636 A 10/2003
(Continued)

*Primary Examiner* — Charlie Y Peng
(74) *Attorney, Agent, or Firm* — Workman Nydegger (57) ABSTRACT The invention provides a planar optical waveguide circuit capable of preventing part of the input signal light that has not been combined in the waveguide and propagates as leaked light from interfering with the output signal. A planar optical waveguide circuit having an optical waveguide embedded in a cladding layer includes: a plurality of parallel output optical waveguides configured to emit light from a same end face; a groove having a reflective interface formed at an angle of +45 degrees relative to the output optical waveguides and configured to reflect leaked light propagating in the cladding layer; and a groove having a reflective interface formed at an angle of −45 degrees, the reflective interface formed at an angle of +45 degrees, the output optical waveguide, and the reflective interface formed at −45 degrees being arranged repeatedly in that order.

18 Claims, 5 Drawing Sheets (56) References Cited

U.S. PATENT DOCUMENTS

| | | | |
|---|---|---|---|
| 2004/0151460 A1 | 8/2004 | Kitcher et al. | |
| 2005/0088727 A1 | 4/2005 | Nakashima et al. | |
| 2007/0230872 A1* | 10/2007 | Suzuki .................. | G02B 6/4214 385/39 |
| 2011/0110629 A1 | 5/2011 | Nagano et al. | |

FOREIGN PATENT DOCUMENTS

| | | |
|---|---|---|
| JP | 2005-215009 A | 8/2005 |
| JP | 2010-32921 A | 2/2010 |
| JP | 5180118 B2 | 1/2013 |
| JP | 5270998 B2 | 3/2013 |
| WO | 2003/084007 A1 | 10/2003 |

\* cited by examiner

PLANAR OPTICAL WAVEGUIDE CIRCUIT

TECHNICAL FIELD

The present invention relates to an optical device used in optical communication networks, and particularly relates to a planar optical waveguide circuit composed of an optical waveguide formed on a substrate.

BACKGROUND ART

With the popularization of the Internet, the demand for data communication networks is growing drastically, and communication technologies such as Wavelength Division Multiplexing (WDM) are used in order to increase the capacity and reduce the size of the optical communication networks to meet the demand. In particular, in order to utilize WDM technology within a transmission module, planar optical waveguide circuits that are small and can easily be mass-produced, having wavelength filter functionality, etc., are being introduced (see Patent Literature 1).

In planar optical waveguide circuits, in order to reduce the size of the module, configurations are often used in which input light is focused with a focus lens and combined in an input optical waveguide, and output light is emitted into free space from an output optical waveguide and directly input into a light receiving element such as a photodiode.

When input and output of optical signals with respect to a planar optical waveguide circuit is carried out through free space in this way without applying an optical fiber, there exists a problem in that it is difficult to combine all the input optical signals in the waveguide, and that part of the uncombined input optical signals will propagate in the planar optical waveguide circuit as leaked light, which mixes with the output signal and reduces signal quality.

Means for solving the problem of leaked light mixing with the output signal have already been disclosed, wherein a groove structure having a reflective interface is formed and the propagation path of leaked light is separated from the output light (see Patent Literature 2).

CITATION LIST

Patent Literature

Patent Literature 1: Japanese Patent No. 5180118
Patent Literature 2: Japanese Patent No. 5270998

SUMMARY OF THE INVENTION

Technical Problem

However, although the already disclosed technology is effective in cases where the path in which leaked light occurs and propagates is determined, there is another problem in that it is not necessarily effective in cases where the propagation path of leaked light is not determined, such as when an input optical signal is focused with a focus lens and combined in an input optical waveguide, in other words in cases where the propagation path of the leaked light changes depending on changes in angle of incidence etc.

An object of the present invention, which has been made in view of such problems, is to provide a planar optical waveguide circuit capable of reducing the rate at which leaked light propagating through various routes in an undetermined manner interferes with the output signal.

Means for Solving the Problem

In order to achieve this object, a first aspect of the present invention is a planar optical waveguide circuit having an optical waveguide embedded in a cladding layer. A planar optical waveguide circuit according to an embodiment of the present invention includes: a plurality of parallel output optical waveguides configured to emit light from a same end face; and a groove formed in the cladding layer, the groove having a reflective interface configured to reflect leaked light propagating in the cladding layer, wherein the reflective interface includes a reflective interface formed at an angle of +45 degrees and a reflective interface formed at an angle of −45 degrees relative to the output optical waveguides, the reflective interface formed at an angle of +45 degrees, the output optical waveguide, and the reflective interface formed at −45 degrees being arranged repeatedly in that order.

Effects of the Invention

As described above, according to the present invention, the inclusion of a groove structure having a reflective interface in the planar optical waveguide circuit makes it possible to lower the rate at which leaked light propagating through various routes in an undetermined manner interferes with the output signal.

DESCRIPTION OF EMBODIMENTS

The present invention solves the problem described above, and one of the characterizing features of a planar optical waveguide circuit according to one aspect of the present invention is the inclusion of a groove structure having a reflective interface to prevent leaked light propagating through various routes in an undetermined manner from mixing with the output signal.

A planar optical waveguide circuit according to an embodiment of the present invention includes a cladding layer, an optical waveguide embedded in the cladding layer, and a groove having a reflective interface formed in the cladding layer that reflects leaked light propagating in the cladding layer. The planar optical waveguide circuit includes a plurality of parallel output optical waveguides that emit light from the same end face.

A reflective interface (first reflective interface) of the planar optical waveguide circuit according to an embodiment of the present invention is formed at an angle of +45 degrees or −45 degrees relative to the output optical waveguides, where the optical axis direction of the output optical waveguides is considered 0 degrees. The arrangement of the output optical waveguides and the first reflective interface is made up of an +45-degree reflective interface, an output optical waveguide, and a −45-degree reflective interface arranged repeatedly in that order.

A reflective interface (second reflective interface) of the planar optical waveguide circuit according to an embodiment of the present invention is provided for each of the output optical waveguides, and is of a structure shaped like part of an ellipse, each ellipse being the same shape with its major axis or minor axis overlapping the respective output optical waveguide.

The planar optical waveguide circuit according to an embodiment of the present invention further includes an input optical waveguide that is parallel to the plurality of parallel output optical waveguides and inputs light from the same end face as an emission end face of the output optical waveguides. A reflective interface (third reflective interface) is formed parallel to the input optical waveguide between the input optical waveguide and the plurality of parallel output optical waveguides.

A length of a groove having the reflective interface (third reflective interface) of the planar optical waveguide circuit according to an embodiment of the present invention is adjusted so that a polarization state of signal light input into the input optical waveguide becomes identical to a polarization state of the signal light at an end point when the groove having the third reflective interface is orthogonally projected onto the input optical waveguide, making it possible to achieve better optical characteristics in the planar optical waveguide circuit.

A reflective interface of the planar optical waveguide circuit according to an embodiment of the present invention includes a metallic thin film for reflecting leaked light. The groove of the planar optical waveguide circuit according to an embodiment of the present invention is filled with a light-blocking material that attenuates light intensity of the leaked light.

The present invention may be practiced as one planar optical waveguide circuit including one or more of the features described above.

Various embodiments of the present invention will be described in detail below, with reference to the drawings. Identical or similar numerals indicate identical or similar elements, and repeated descriptions thereof are omitted.

First Embodiment

Figure 1:
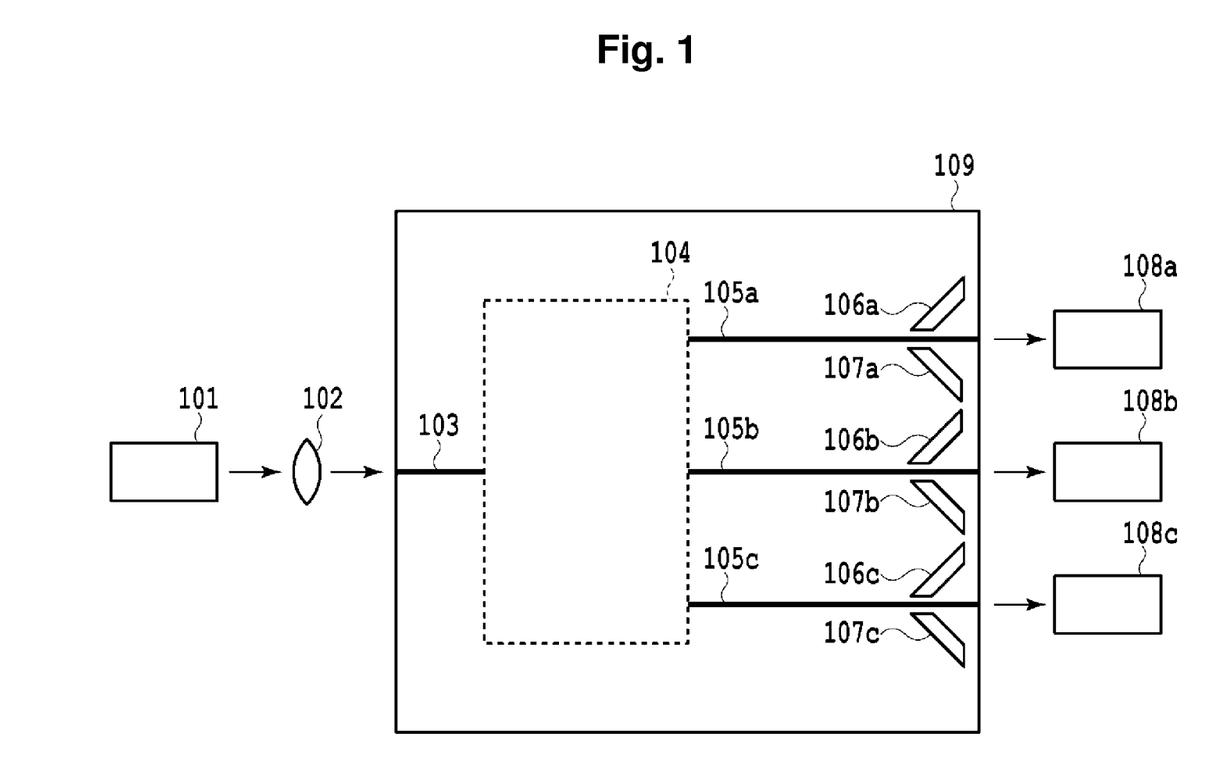
FIG. 1 is a schematic diagram showing a planar optical waveguide circuit according to a first embodiment of the present invention.

A planar optical waveguide circuit according to a first embodiment of the present invention will be described with reference to FIG. 1. The planar optical waveguide circuit 109 shown in FIG. 1 is an example, and the present invention is not limited to this example. The invention may be a planar optical waveguide circuit including one or more of the various features described above.

In the present embodiment, an example is described in which the number of input ports of the planar optical waveguide circuit is 1 and the number of output ports is 3, but it should be obvious that the number of input and output ports is not limited to this example.

As shown in FIG. 1, the planar optical waveguide circuit 109 includes an optical circuit 104. The optical circuit 104 is connected to the input port via an input optical waveguide 103. The optical circuit 104 is also connected to the three output ports which are on the same end face via three parallel output optical waveguides 105a to 105c. FIG. 1 shows a light source 101 and a lens 102 on the input port side of the planar optical waveguide circuit 109, and photoelectric conversion elements 108a to 108c on the output port side of the optical waveguide circuit 109.

In FIG. 1, an optical signal output from the light source 101 is focused by the lens 102, and is input into the input optical waveguide 103 of the planar optical waveguide circuit 109 (however, the light source and lens may be of any type and configuration). The input optical signal propagates through the parallel output optical waveguides 105a to 105c via the optical circuit 104 having the function of the planar optical waveguide circuit 109, and is output to the exterior of the planar optical waveguide circuit 109. The output optical signal is received, for example, by the photoelectric conversion elements 108a to 108c.

In addition, optical signals that are input into the input optical waveguide 103 but are not combined in the input optical waveguide will propagate through the interior of the planar optical waveguide circuit 109 as leaked light. Part of the leaked light will mix with the optical signals output from the output optical waveguides 105a to 105c, and will be received by the photoelectric conversion elements 108a to 108c.

In the present embodiment, in order to prevent leaked light that has mixed with the optical signals output by the output optical waveguides 105a to 105c from being received by the photoelectric conversion elements 108a to 108c, the planar optical waveguide circuit 109 has formed therein grooves 106a to 106c having reflective interfaces formed at an angle of +45 degrees relative to the output optical waveguides 105 and grooves 107a to 107c having reflective interfaces formed at an angle of −45 degrees relative to the output optical waveguides 106 (in the present embodiment, the optical axis direction of the output optical waveguides 105 is considered 0 degrees).

Figure 2:
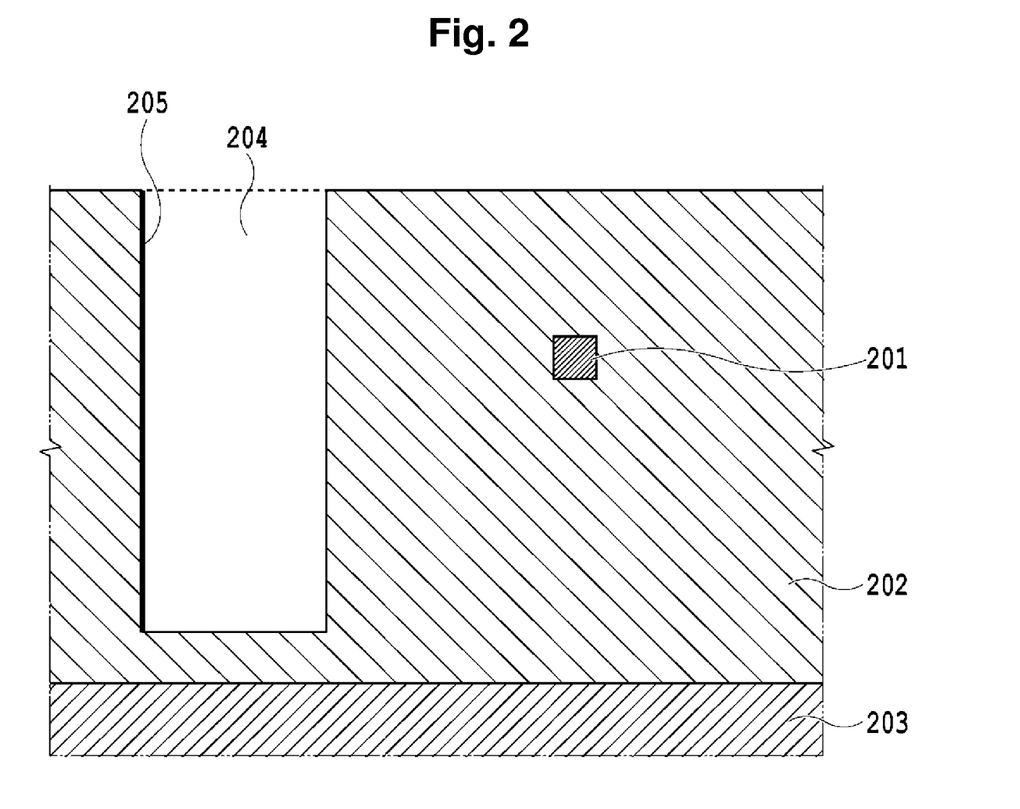
FIG. 2 is a cross-sectional schematic diagram showing the planar optical waveguide circuit according to the first embodiment of the present invention.

FIG. 2 shows an example of a cross-sectional structure of the planar optical waveguide circuit according to the present embodiment.

A cladding layer 202 and an optical waveguide 201 are laminated on a substrate 203. A groove 204 is formed by removing the cladding layer to a position deeper than the optical waveguide 201. In addition, a reflective interface 205 is formed on a sidewall of the groove 204. The surface of the reflective interface 205 is preferably smooth. The optical waveguide 201 corresponds to the output optical waveguide described above or the input optical waveguide described below, and the groove 204 having the reflective interface 205 formed therein corresponds to the grooves 106 having reflective interfaces formed at an angle of +45 degrees or the grooves 107 having reflective interfaces formed at an angle of −45 degrees described above.

The effects of the present invention may be enhanced by forming a metallic thin film on the reflective interface 205 to increase the reflectivity. The effects of the present invention may also be enhanced by filling the groove 204 with a light-blocking material that attenuates light intensity.

Figure 3:
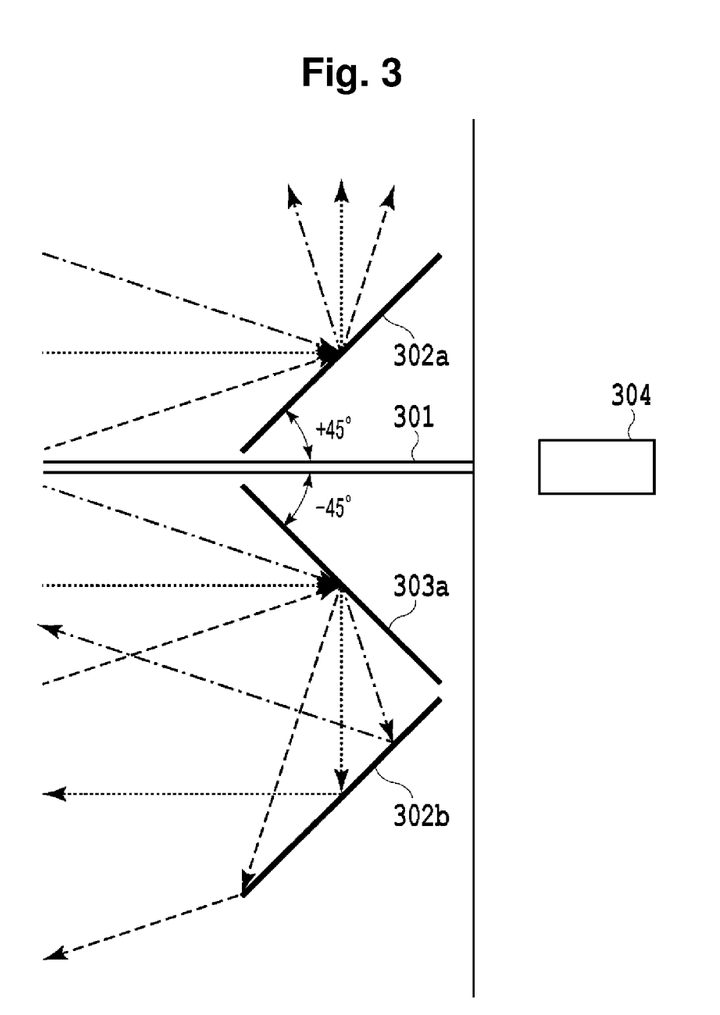
FIG. 3 is a schematic diagram describing a reflective interface and a light path of leaked light according to the first embodiment of the present invention.

FIG. 3 is a schematic diagram describing the reflective interface and a light path of leaked light in the planar optical waveguide circuit according to the present embodiment.

Described in detail are the output optical waveguide 301 and the photoelectric conversion element 304 that receives the output optical signal, the reflective interface 302a formed at an angle of +45 degrees adjacent to the output optical waveguide 301, the reflective interface 303a formed at an angle of −45 degrees adjacent to the output optical waveguide 301, and the reflective interface 302b formed at an angle of +45 degrees adjacent to the reflective interface 303a.

The propagation direction of leaked light that propagates within the planar optical circuit toward the photoelectric conversion element 304 is random. FIG. 3 schematically shows light beams of leaked light that propagates in a direction parallel to the output optical waveguide 301 in dot lines, light beams that of leaked light that propagates at a positive angle relative to the output optical waveguide in dash lines, and light beams of leaked light that propagates at a negative angle relative to the output optical waveguide in dash-dot lines.

When the leaked light is reflected once by the reflective interface 302a, it is oriented in a direction in which no photoelectric conversion element 304 is present. Further, when the leaked light is reflected twice by the reflective interface 303a and the reflective interface 302b, it is oriented in a direction inverted by 180 degrees, since the reflective interfaces 302 and 303 are orthogonal with each other.

In this way, by providing reflective interfaces formed at angles that are +45 degrees and −45 degrees relative to the output optical waveguide, interference of the leaked light with the output signal can be efficiently reduced.

Second Embodiment

Figure 4:
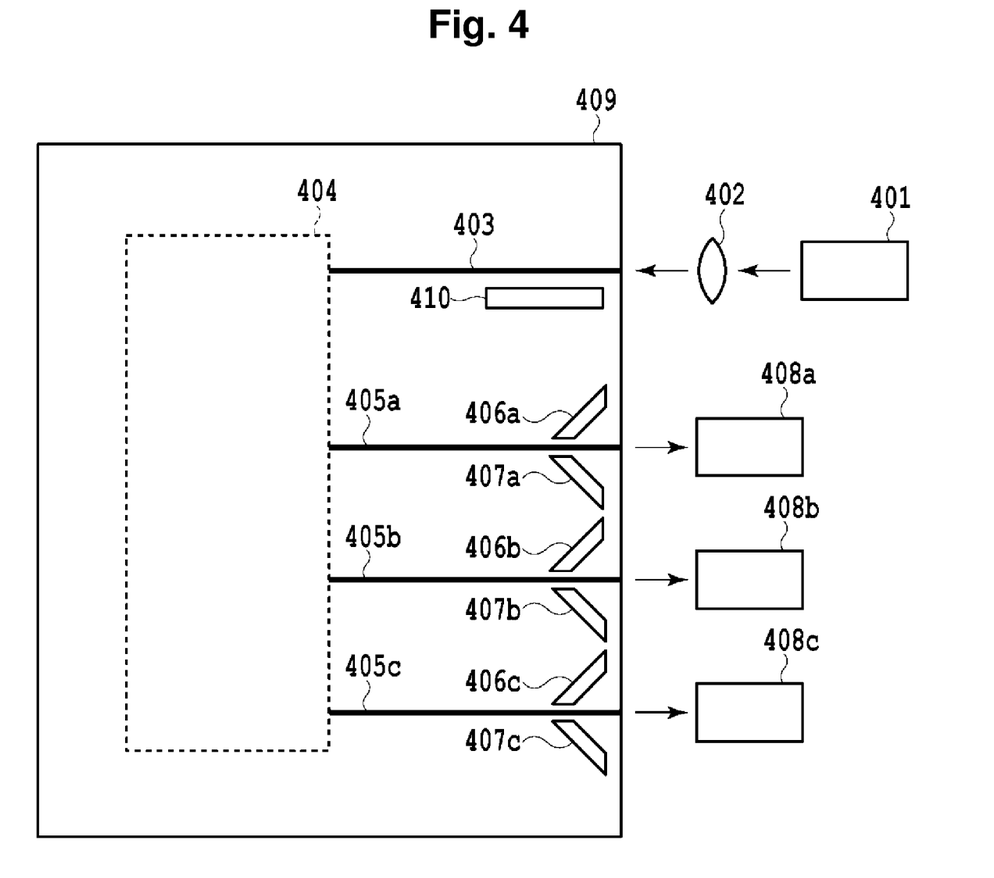
FIG. 4 is a schematic diagram showing a planar optical waveguide circuit according to a second embodiment of the present invention.

A planar optical waveguide circuit according to a second embodiment of the present invention will be described with reference to FIG. 4. The planar optical waveguide circuit 409 shown in FIG. 4 is an example, and the present invention is not limited to this example. The invention may be a planar optical waveguide circuit including one or more of the various features described above.

In the present embodiment, an example is described in which the number of input ports of the planar optical waveguide circuit is 1 and the number of output ports is 3, and they are all on the same end face, but it should be obvious that the number of input and output ports is not limited to this example.

As shown in FIG. 4, the planar optical waveguide circuit 409 includes an optical circuit 404. The optical circuit 404 is connected to the input port via an input optical waveguide 403. The optical circuit 404 is also connected to the three output ports which are on the same end face via three parallel output optical waveguides 405a to 405c. FIG. 4 shows a light source 401 and a lens 402 on the input port side of the planar optical waveguide circuit 409, and photoelectric conversion elements 408a to 408c on the output port side of the optical waveguide circuit 109.

In FIG. 4, an optical signal output from the light source 401 is focused by the lens 402, and is input into the input optical waveguide 403 of the planar optical waveguide circuit 409 (however, the light source and lens may be of any type and configuration). The input optical signal propagates through the parallel output optical waveguides 405a to 405c via the optical circuit 404 having the function of the planar optical waveguide circuit 409, and is output to the exterior of the planar optical waveguide circuit 409. The output optical signal is received, for example, by the photoelectric conversion elements 408a to 408c. In addition, optical signals that are input into the input optical waveguide 403 but are not combined in the input optical waveguide will propagate through the interior of the planar optical waveguide circuit 409 as leaked light. In order to prevent part of the leaked light from mixing with the optical signals output from the output optical waveguides 405a to 405c and being received by the photoelectric conversion elements 408a to 408c, the planar optical waveguide circuit 409 has formed therein grooves 406a to 406c having reflective interfaces formed at an angle of +45 degrees relative to the output optical waveguides 405 and grooves 407a to 407c having reflective interfaces formed at an angle of −45 degrees relative to the output optical waveguides (in the present embodiment, the optical axis direction of the output optical waveguides 405 is considered 0 degrees).

Further, in the present embodiment, the incidence end face and the emission end face of the signal light are the same, the input optical waveguide 403 and the output optical waveguides 405 are parallel to one another, and a groove 410 is formed between the input optical waveguide 403 and the output optical waveguides 405, the groove 410 having a reflective interface formed parallel to the input optical waveguide 403.

The principle by which the grooves 406a to 406c and 407a to 407c having reflective interfaces reduce mixing of leaked light into the output signal is the same as in the first embodiment.

Since the groove 410 having a reflective interface is formed between the input optical waveguide 403 and the output optical waveguide 405, it has the function of reflecting part of the leaked light that is not combined in the input optical waveguide and propagates to the output optical waveguide side, and can thus efficiently reduce the rate at which leaked light interferes with the output optical signal.

Moreover, by forming the groove 410 having the reflective interface in close proximity to the input optical waveguide, the rate at which leaked light mixes into the output optical signal can be reduced. By forming the groove 410 having the reflective interface in close proximity to the incidence end face, the rate at which leaked light mixes into the output optical signal can be further reduced.

It should be noted that the groove 410 having the reflective interface is only formed on one side (the side on which the output optical waveguides are formed) of the input optical waveguide 403. The input optical waveguide thus has a structure which is left/right asymmetrical in the propagation direction. When signal light propagates through the optical waveguide with such an asymmetrical structure, the polarization state of the signal light will change according to propagation distance, and at a certain propagation distance the polarization state will be restored. Accordingly, by adjusting the length of the groove 410 having the reflective interface so that the polarization state of the signal light input into the input optical waveguide 403 becomes identical to the polarization state of the signal light at the end point when the groove 410 having the reflective interface is orthogonally projected onto the input optical waveguide 403, i.e. at the end point of the asymmetrical section of the input optical waveguide 403, improved optical characteristics can be achieved, without any influence by the change in polarization state.

The cross-sectional structure of the planar optical waveguide circuit is similar to that of the first embodiment. Likewise, the surface of the reflective interface is preferably smooth, the effects of the present invention may be enhanced by forming a metallic thin film on the reflective interface to increase the reflectivity, and the effects of the present invention may also be enhanced by filling the groove with a light-blocking material that attenuates light intensity.

Third Embodiment

Figure 5:
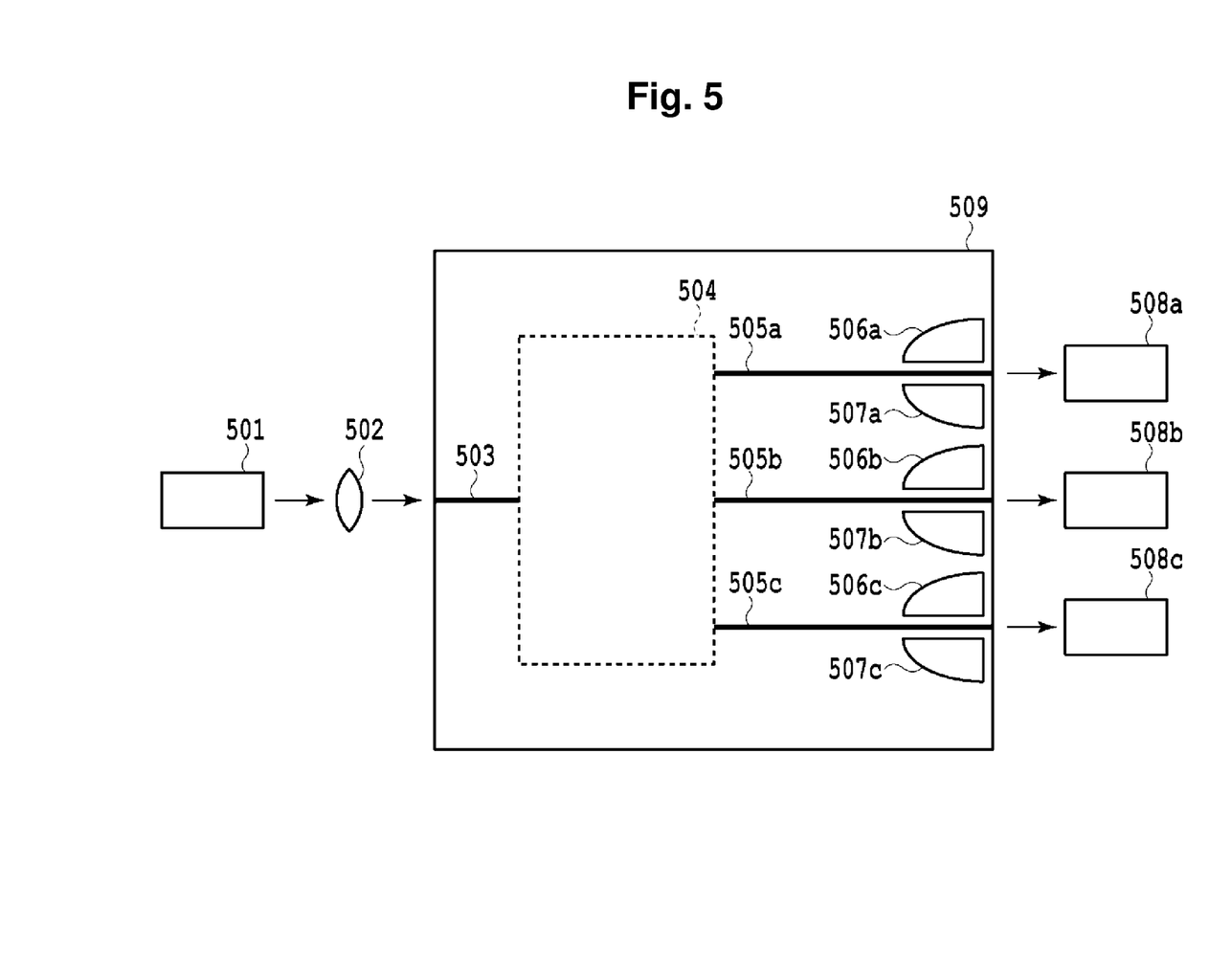
FIG. 5 is a schematic diagram showing a planar optical waveguide circuit according to a third embodiment of the present invention.

A planar optical waveguide circuit according to a third embodiment of the present invention will be described with reference to FIG. 5. The planar optical waveguide circuit 509 shown in FIG. 5 is an example, and the present invention is not limited to this example. The invention may be a planar optical waveguide circuit including one or more of the various features described above.

In the present embodiment, an example is described in which the number of input ports of the planar optical waveguide circuit is 1 and the number of output ports is 3, but it should be obvious that the number of input and output ports is not limited to this example.

As shown in FIG. 5, the planar optical waveguide circuit 509 includes an optical circuit 504. The optical circuit 504 is connected to the input port via an input optical waveguide 503. The optical circuit 504 is also connected to the three output ports which are on the same end face via three parallel output optical waveguides 505a to 505c. FIG. 5 shows a light source 501 and a lens 502 on the input port side of the planar optical waveguide circuit 509, and photoelectric conversion elements 508a to 508c on the output port side of the optical waveguide circuit 509.

In FIG. 5, an optical signal output from the light source 501 is focused by the lens 502, and is input into the input optical waveguide 503 of the planar optical waveguide circuit 509 (however, the light source and lens may be of any type and configuration). The input optical signal propagates through the parallel output optical waveguides 505a to 505c via the optical circuit 504 having the function of the planar optical waveguide circuit 509, and is output to the exterior of the planar optical waveguide circuit 509. The output optical signal is received, for example, by the photoelectric conversion elements 508a to 508c.

In addition, optical signals that are input into the input optical waveguide 503 but are not combined in the input optical waveguide will propagate through the interior of the planar optical waveguide circuit 509 as leaked light. Part of the leaked light will mix with the optical signals output from the output optical waveguides 505a to 505c, and will be received by the photoelectric conversion elements 508a to 508c.

In the present embodiment, in order to prevent leaked light that has mixed with the optical signals output by the output optical waveguides 505a to 505c from being received by the photoelectric conversion elements 508a to 508c, the planar optical waveguide circuit 509 has formed therein, with respect to each output optical waveguide, grooves 506a to 506c and 507a to 507c having reflective interfaces each shaped like part of an ellipse, the major axis or minor axis of the ellipse overlapping the respective output optical waveguide, and each ellipse being of the same size.

The cross-sectional structure of the planar optical waveguide circuit is similar to that of the first embodiment. Likewise, the surface of the reflective interface is preferably smooth, the effects of the present invention may be enhanced by forming a metallic thin film on the reflective interface to increase the reflectivity, and the effects of the present invention may also be enhanced by filling the groove with a light-blocking material that attenuates light intensity.

Since the reflective interface in the present embodiment is shaped like part of an ellipse, leaked light that is incident in parallel on different positions of the reflective interface will be scattered at different angles. While the propagation direction of the leaked light is random, it is extremely unlikely that leaked light propagating from various angles being reflected by the reflective interface shaped like an ellipse would be focused onto the photoelectric conversion element provided on a line extending from the output optical waveguide and interfere with the output signal. Thus, in general, scattering the leaked light in a wide range of directions lowers the probability of the leaked light reaching the photoelectric conversion element, which allows for efficient reduction of interference with the output signal.

Fourth Embodiment

The present embodiment is a modification example of the structure of the planar optical waveguide circuit 409 according to the second embodiment described with reference to FIG. 4, wherein, with respect to each of the output optical waveguides 405, grooves 406 having reflective interfaces formed at +45 degrees and grooves 407 having reflective interfaces formed at −45 degrees are provided, and a groove 410 having a reflective interface formed parallel to the output optical waveguides is provided between the input optical waveguide 403 and the output optical waveguides 405.

The present invention may also be implemented as a planar optical waveguide circuit having a configuration in which the grooves 406 and 407 having the reflective interfaces in the planar optical waveguide circuit 409 shown in FIG. 4 are replaced with the grooves 506 and 507 having the reflective interfaces shaped like part of an ellipse and the major or minor axis of the ellipse overlaps with the output optical waveguide as shown in FIG. 5.

It should be obvious that interference of the leaked light with the output signal can also be efficiently reduced by a combination of a groove having a reflective interface shaped like an ellipse and a groove having reflective interface formed parallel to the input optical waveguide between the input optical waveguide and the output optical waveguides.

Likewise, by adjusting the length of the groove having the reflective interface formed parallel to the input optical waveguide so that the polarization state of the signal light input into the input optical waveguide becomes identical to the polarization state of the signal light at the end point when the groove having the reflective interface is orthogonally projected onto the input optical waveguide, improved optical characteristics can be achieved, without any influence by the change in polarization state.

In addition, the cross-sectional structure of the planar optical waveguide circuit is similar to that of the first embodiment. Further, the surface of the reflective interface is preferably smooth. The effects of the present invention may be enhanced by forming a metallic thin film on the reflective interface to increase the reflectivity. The effects of the present invention may also be enhanced by filling the groove with a light-blocking material that attenuates light intensity.

REFERENCE SIGNS LIST 101, 401, 501 Light source
102, 402, 502 Lens
103, 403, 503 Input optical waveguide
104, 404, 504 Optical circuit
105a to 105c, 301, 405a to 405c, 505a to 505c Output optical waveguide
106a to 106c, 302a, 302b, 406a to 406c Groove having a reflective interface formed at an angle of +45 degrees relative to the output optical waveguide
107a to 107c, 303a, 407a to 407c Groove having a reflective interface formed at an angle of −45 degrees relative to the output optical waveguide
108a to 108c, 304, 408a to 408c, 508a to 508c Photoelectric conversion element 109, 409, 509 Planar optical waveguide circuit
201 Optical waveguide
202 Cladding layer
203 Substrate
204 Groove
205 Reflective interface
410 Groove having a reflective interface
506a to 506c, 507a to 507c Groove having a reflective interface shaped like part of an ellipse, the major axis or minor axis of the ellipse overlapping the output optical waveguide

The invention claimed is:

1. A planar optical waveguide circuit having an optical waveguide embedded in a cladding layer, the planar optical waveguide circuit comprising:
a plurality of parallel output optical waveguides configured to emit light from a same end face; and
a groove formed in the cladding layer, the groove having a reflective interface configured to reflect leaked light propagating in the cladding layer,
wherein:
the reflective interface includes a reflective interface formed at an angle of +45 degrees and a reflective interface formed at an angle of −45 degrees relative to the output optical waveguides,
the reflective interface formed at an angle of +45 degrees, the output optical waveguide, and the reflective interface formed at −45 degrees being arranged repeatedly in that order.

2. The planar optical waveguide circuit according to claim 1, further comprising:
an input optical waveguide parallel to the plurality of parallel output optical waveguides and configured to input light from the same end face as an emission end face of the output optical waveguides; and
a groove parallel to the input optical waveguide and having a third reflective interface formed between the input optical waveguide and the plurality of parallel output optical waveguides.

3. The planar optical waveguide circuit according to claim 2, wherein a length of the groove having the third reflective interface is such that a polarization state of signal light input into the input optical waveguide becomes identical to a polarization state of the signal light at an end point when the groove having the third reflective interface is orthogonally projected onto the input optical waveguide.

4. The planar optical waveguide circuit according to claim 1, wherein the reflective interface comprises a metallic thin film for reflecting the leaked light.

5. The planar optical waveguide circuit according to claim 1, wherein the groove having the reflective interface is filled with a light-blocking material that attenuates light intensity of the leaked light.

6. The planar optical waveguide circuit according to claim 2, wherein the reflective interface comprises a metallic thin film for reflecting the leaked light.

7. The planar optical waveguide circuit according to claim 3, wherein the reflective interface comprises a metallic thin film for reflecting the leaked light.

8. The planar optical waveguide circuit according to claim 2, wherein the groove having the reflective interface is filled with a light-blocking material that attenuates light intensity of the leaked light.

9. The planar optical waveguide circuit according to claim 3, wherein the groove having the reflective interface is filled with a light-blocking material that attenuates light intensity of the leaked light.

10. A planar optical waveguide circuit having an optical waveguide embedded in a cladding layer, the planar optical waveguide circuit comprising:
a plurality of parallel output optical waveguides configured to emit light from a same end face; and
a groove formed in the cladding layer, the groove having a reflective interface configured to reflect leaked light propagating in the cladding layer,
wherein:
the reflective interface is structured to be shaped like part of an ellipse and provided with respect to each of the output optical waveguides,
each ellipse being of the same shape and a major axis or minor axis of the ellipse overlapping with the output optical waveguide.

11. The planar optical waveguide circuit according to claim 10, further comprising:
an input optical waveguide parallel to the plurality of parallel output optical waveguides and configured to input light from the same end face as an emission end face of the output optical waveguides; and
a groove parallel to the input optical waveguide and having a third reflective interface formed between the input optical waveguide and the plurality of parallel output optical waveguides.

12. The planar optical waveguide circuit according to claim 11, wherein a length of the groove having the third reflective interface is such that a polarization state of signal light input into the input optical waveguide becomes identical to a polarization state of the signal light at an end point when the groove having the third reflective interface is orthogonally projected onto the input optical waveguide.

13. The planar optical waveguide circuit according to claim 10, wherein the reflective interface comprises a metallic thin film for reflecting the leaked light.

14. The planar optical waveguide circuit according to claim 11, wherein the reflective interface comprises a metallic thin film for reflecting the leaked light.

15. The planar optical waveguide circuit according to claim 12, wherein the reflective interface comprises a metallic thin film for reflecting the leaked light.

16. The planar optical waveguide circuit according to claim 10, wherein the groove having the reflective interface is filled with a light-blocking material that attenuates light intensity of the leaked light.

17. The planar optical waveguide circuit according to claim 11, wherein the groove having the reflective interface is filled with a light-blocking material that attenuates light intensity of the leaked light.

18. The planar optical waveguide circuit according to claim 12, wherein the groove having the reflective interface is filled with a light-blocking material that attenuates light intensity of the leaked light.

* * * * *